March 19, 1968   H. F. W. ARFERT   3,373,895
PULL TAB OPENING MEANS AND METHOD OF MAKING SAME
Filed May 17, 1966   3 Sheets-Sheet 1
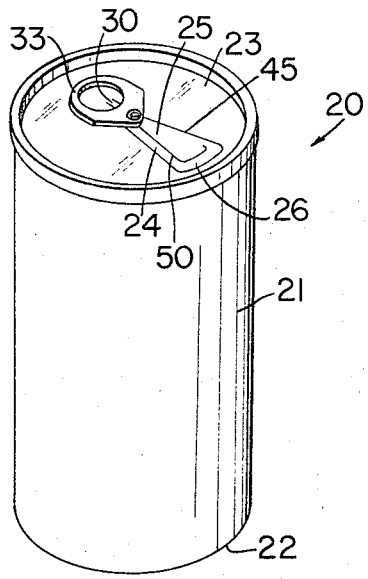
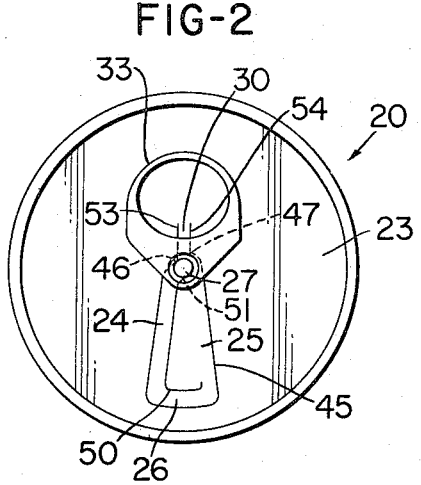
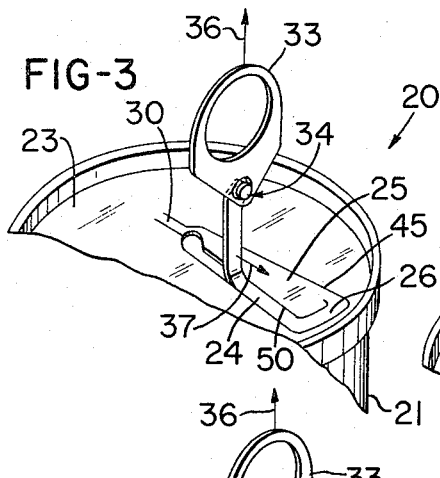
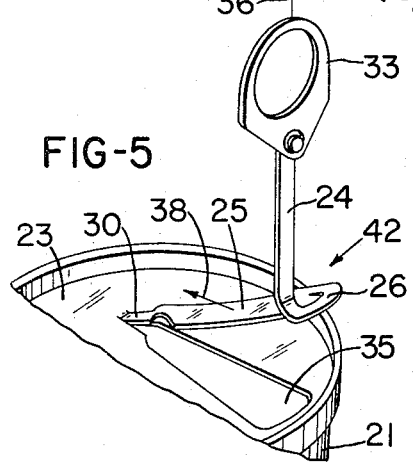
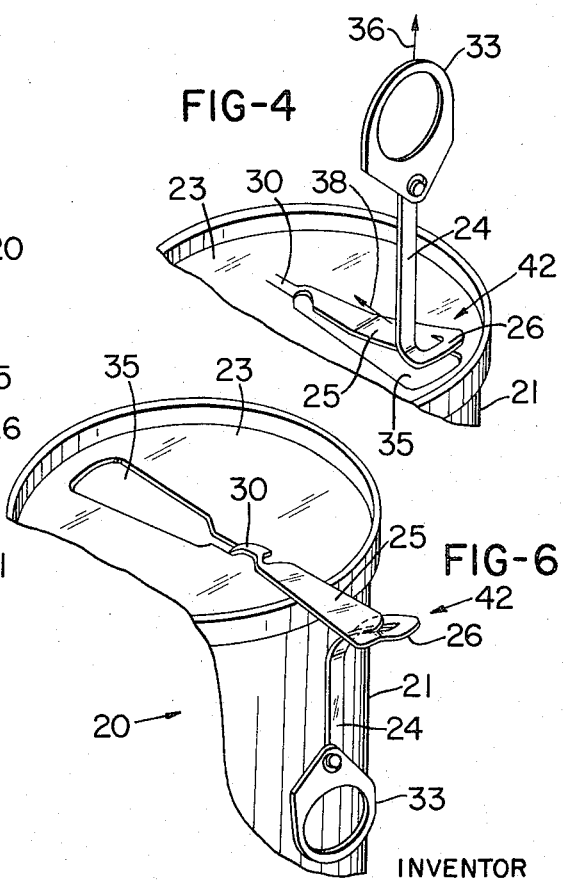
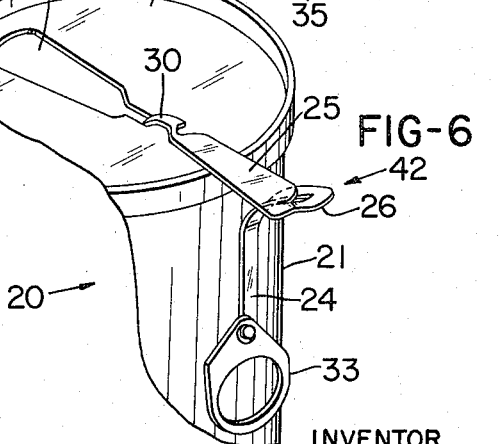
INVENTOR
HORST F. W. ARFERT
BY *Glenn, Palmer, Matthews & Lyne*
HIS ATTORNEYS

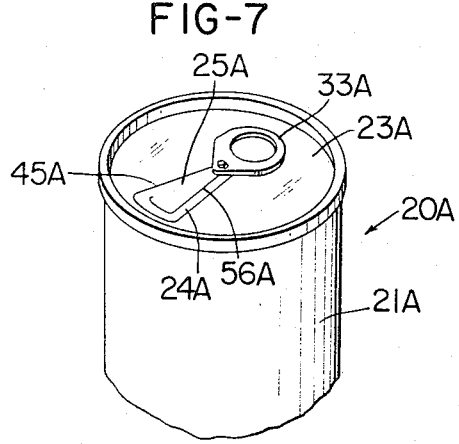
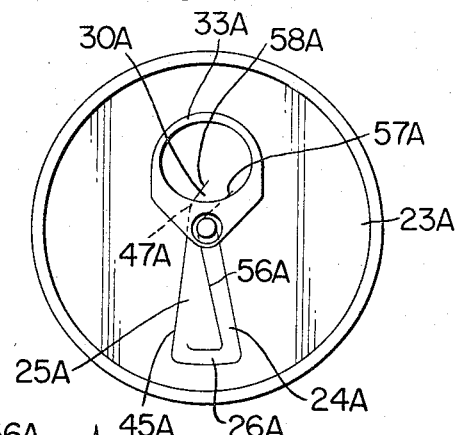
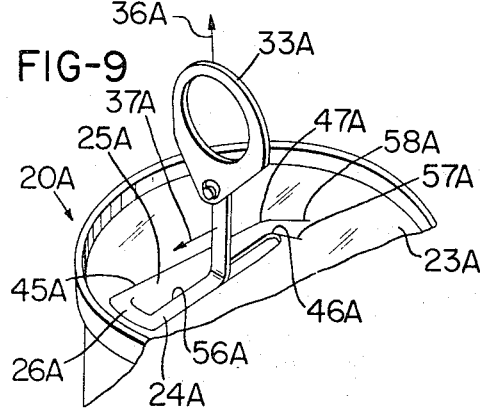
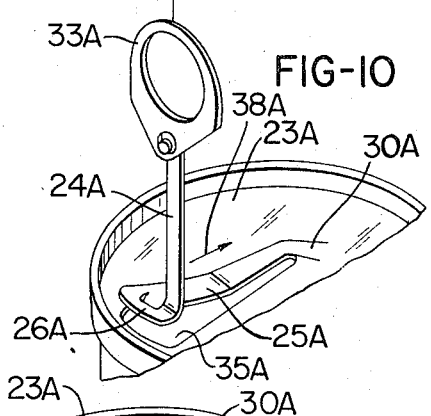
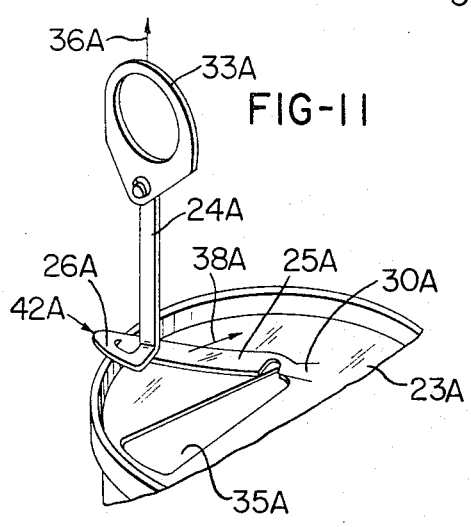
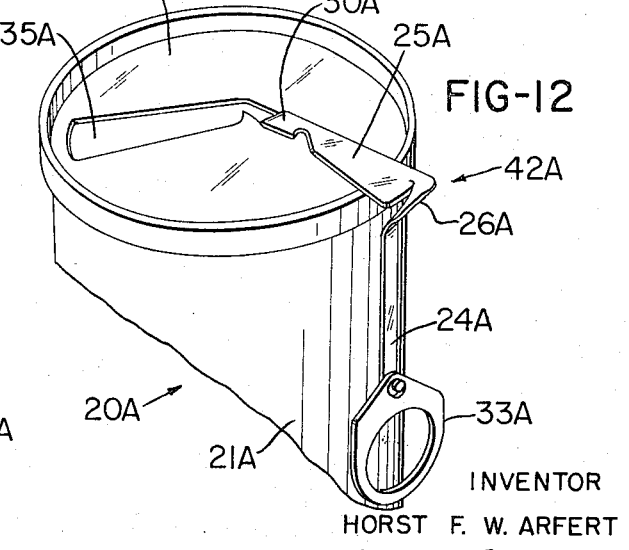

March 19, 1968   H. F. W. ARFERT   3,373,895
PULL TAB OPENING MEANS AND METHOD OF MAKING SAME
Filed May 17, 1966   3 Sheets-Sheet 3

INVENTOR
HORST F. W. ARFERT

BY *Glenn, Palmer,
Matthews & Lyne*
HIS ATTORNEYS

United States Patent Office 3,373,895
Patented Mar. 19, 1968

3,373,895
PULL TAB OPENING MEANS AND METHOD
OF MAKING SAME
Horst F. W. Arfert, Richmond, Va., assignor to Reynolds Metals Company, Richmond, Va., a corporation of Delaware
Filed May 17, 1966, Ser. No. 550,759
32 Claims. (Cl. 220—54)

This invention pertains to non-detachable opening means, and more particularly to improved non-detachable opening means for container means.

There are numerous opening devices such as pull tab devices in current use which are used to provide a dispensing opening in an associated metallic top wall of container means, such as metal beverage cans, or the like. Each of such current pull tab devices is generally of the type which severs away a portion of its associated metallic wall which is then discarded and often causes injury because of its sharp edges. For example, in those instances where current opening devices are used on beverage cans used in sandy areas such as beaches, camping grounds, or the like, where numerous people are walking barefooted, many foot injuries have occurred because such comparatively small current pull tab devices are discarded, buried from view in such sandy areas, and subsequently stepped on. Current opening devices also require the application of a comparatively large force to open. It is therefore desirable to provide a beverage can having opening means, such as a pull tab device, which is easy to open, provides an easily accessible opening for dispensing the contents of such can by either drinking directly from such opening or pouring therefrom, and which remains attached to its associated can. It is not practical to attempt to utilize a presently available pull tab device to achieve the desired performance by stopping short of severing the entire current opening device from its associated can because the construction of such current devices would prevent proper access to the dispensing opening for drinking and/or pouring.

Accordingly, it is a feature of this invention to provide an improved non-detachable opening means for container means economically and without major modification of existing equipment.

Another feature of this invention is to provide an improved non-detachable opening means for container means which enables provision of an opening in such container means with the application of a minimum amount of force and which enables such opening means to be moved away from such opening thus provided for easy access thereto.

Another feature of this invention is to provide an improved non-detachable opening means of the character mentioned which enables providing an opening in associated container means by merely pulling in one direction generally transverse to the wall means within which such opening is provided.

Another feature of this invention is to provide an improved non-detachable opening means which is versatile and capable of being used with practically any type of pull device therefor, as desired, and such pull device may be fastened in any known manner.

Another feature of this invention is to provide an improved non-detachable opening means which is so constructed and arranged that the pulling force increases greatly at the conclusion of the severing operation used to define an opening in such container means, thereby assuring that the material pulled away to define such opening is not removed from the associated container means and discarded.

Another feature of this invention is to provide an improved method of making non-detachable opening means in wall means of container means simply and economically.

Another feature of this invention is to provide an improved method of making such non-detachable opening means which is easily opened with the application of comparatively little force to provide a combination strip of sufficient length to enable it to be severed and moved away from the opening thus provided, yet assuring that such combination strip is not separated from its associated container means.

Another feature of this invention is to provide an improved blank which is suitably cut and scored to define wall means of container means having integral non-detachable opening means therein.

Another feature of this invention is to provide an improved method of making non-detachable opening means in such blank simply and economically.

Therefore, it is an object of this invention to provide an improved non-detachable opening means and an improved method of making such opening means having one or more of the novel features of this invention as set forth above or hereinafter shown or described.

Another object of this invention is to provide inexpensive blanks for container means having integral non-detachable opening means therein and an improved method of making such blanks.

Other objects, uses, and advantages of this invention are apparent from a reading of this description which proceeds with reference to the accompanying drawings forming a part thereof and wherein:

FIGURE 1 is a perspective view of cylindrical container means, such as a beverage can, having one embodiment of the improved non-detachable opening means of this invention provided in the top wall thereof.

FIGURE 2 is a view looking perpendicular to the top of the beverage can of FIGURE 1.

FIGURE 3 is a fragmentary perspective view of the top end portion of the beverage can of FIGURE 1 showing the first stage in the sequence of severing a pair of integral elongated side-by-side strips defining an elongated opening in the top wall of such beverage can by applying a pulling force essentially transverse to such top wall.

FIGURE 4 is a perspective view similar to FIGURE 3 showing a later stage in the provision of such opening in such top wall.

FIGURE 5 is a perspective view similar to FIGURE 4 showing a still later stage in the provision of such opening.

FIGURE 6 is a perspective view similar to FIGURE 5 illustrating a final stage in the provision of such opening and showing a combination strip comprised of such pair of elongated side-by-side strips bent over the peripheral top edge of the beverage can and thereby permitting easy access to such opening.

FIGURE 7 is a fragmentary perspective view of a cylindrical beverage can similar to the can illustrated in FIGURE 1 and having another embodiment of improved non-detachable opening means incorporated in its top wall.

FIGURE 8 is a view looking perpendicular to the top wall of the beverage can of FIGURE 7.

FIGURE 9 is a fragmentary perspective view, similar to FIGURE 3, of the top end portion of the can of FIGURE 7 showing the first stage of severing an opening in the top wall thereof.

FIGURE 10 is a perspective view similar to FIGURE 9 showing a later stage in the provision of such opening in such top wall.

FIGURE 11 is a perspective view similar to FIGURE 10 showing a still later stage in the provision of such opening.

FIGURE 12 is a perspective view similar to FIGURE 6 illustrating combination strip means severed from the top wall of the can of FIGURE 7 and bent over the peripheral top edge of such can at an angular position with respect to the elongated axis of the opening thus defined to thereby provide easy access to such opening.

Figure 13:
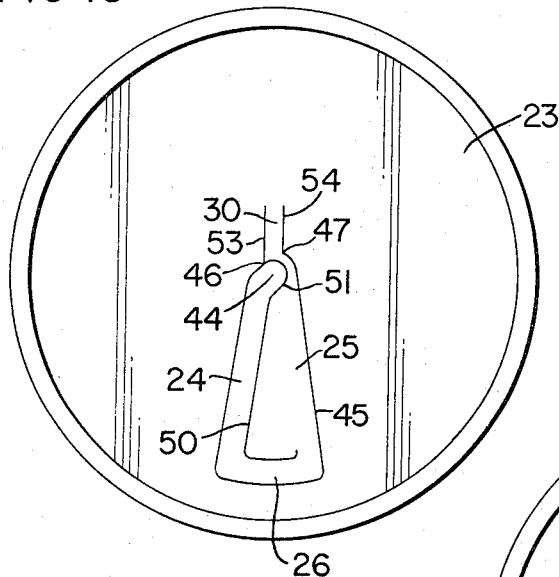
FIGURE 13 is an enlarged plan view of the blank used to make the top wall of the beverage can of FIGURE 1.

While the various features of this invention are hereinafter illustrated and described as being particularly adaptable for providing improved non-detachable opening means for cylindrical container means such as beverage cans for juices, carbonated beverages, beer, or the like, and to an improved method of making such non-detachable opening means, it is to be understood that the various features of this invention can be utilized singly or in any combination thereof to provide non-detachable opening means for other articles and uses as desired.

Therefore, this invention is not to be limited to only the embodiments illustrated in the drawings because the drawings are merely utilized to illustrate one of the wide variety of uses of this invention.

In the exemplary embodiment of this invention of FIGURES 1-6, right circular cylindrical container means shown as a beverage can 20 having the improved non-detachable opening means and made by employing the improved method of this invention is illustrated. Beverage can 20 has a cylindrical side wall 21 and a pair of end walls illustrated as a bottom wall 22 and a top wall 23.

Top wall 23 has integral first and second elongated strip means designated respectively by the numerals 24 and 25 and provided therein alongside each other. Elongated strips 24 and 25 have common end means or a common end 26.

Figure 13A:
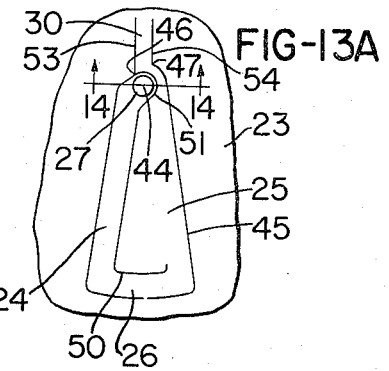
FIGURE 13A is a fragmentary plan view illustrating fastening means such as integral rivet means formed as a projection in the top wall of FIGURE 13 for fastening a pull device thereto.
Figure 14:
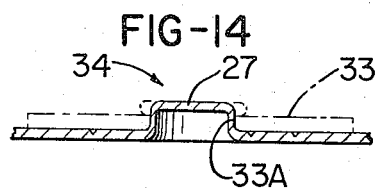
FIGURE 14 is a fragmentary sectional view on the line 14—14 of FIGURE 13A showing (by dotted lines) the rivet means riveted against a pull ring comprising the opening means of FIGURE 1.

In this example of the invention, strip 24 has fastening means, see FIGURES 13A and 14, illustrated as a projection 27 in its end portion which is arranged opposite its common end 26 for attaching pull means thereto. Projection 27 is hat-shaped and formed by extruding a portion of strip 24 outwardly.

Strip 25 has attached end means 30 attached to top wall 23 at a position opposite common end 26 and preferably adjoining fastening means 27. Attached end means 30 illustrated in this example of the invention comprises providing end 30 as an integral part of top wall 23.

The pull means comprises a pull ring 33 fastened to first strip means or strip 24 by using fastening means or hat-shaped projection 27. Pull ring 33 is fastened in a known manner by providing a suitable opening 33A therein, placing such ring with its opening 33A in position about projection 27, and then riveting projection 27 against ring 33 to form a rivet designated by the numeral 34.

Thus, as seen in FIGURES 2-6 of the drawings, elongated strips 24 and 25 are easily and sequentially severed to define an elongated opening 35 in top wall 23 by grasping ring 33 and applying a pulling force which is of comparatively small magnitude as compared to the pulling force required to open a can utilizing a conventional pull tab device. The pulling force required to sever elongated side-by-side strips 24 and 25 is illustrated in FIGURES 3-5 as being preferably in one direction generally transverse to top wall 23 as shown by an arrow designated by the numeral 36. While the transverse pulling force is illustrated as being approximately perpendicular to top wall 23, it will be appreciated that such transverse pulling force as indicated by the arrow 36 could be at any angle with respect to the plane of top wall 23.

Although ring 33 is preferably pulled outwardly in one direction, the force components which are effective in serving first strip 24 and then strip 25 are designated by the numerals 37 and 38 in FIGURES 3 and 4 respectively. Force component 37 acts generally from the center of top wall 23 and outwardly toward the periphery thereof during the process of severing elongated strip 24. After strip 24 has been severed, effective force component 38 acts generally from the periphery of top wall 23 at an angle toward the center thereof in tearing out elongated strip 25.

The tearing out or severing of strips 24 and 25 defines combination strip means or a combination strip indicated generally by the numeral 42, see particularly FIGURE 6. Combination strip 42 is held to top wall 23 by integral attached end portion 30 of strip 25 and has an overall length which is defined by the effective overall length of strip 24 and strip 25 pulled approximately end to end while being held together by common end 26.

The effective overall length of combination strip 42 enables such strip to be moved away from opening 35 provided in top wall 23 for easy access thereto. This moving away of strip 42 while it is rigidly attached at one end enables one to drink directly from opening 35 in beverage can 20 without interfering with the drinking action. With the combination strip 42 in the position illustrated in FIGURE 6, it is also possible to easily pour the contents of beverage can 20 into another receptacle or dispense such contents as desired without interference by strip 42.

By holding combination strip 42 firmly attached to top wall 23 it is possible to prevent such strip from being easily severed, torn from can 20, and discarded into locations where injury could occur later. As previously mentioned many present pull tab devices have caused injury in areas such as beach areas, camping areas, and the like, because it is necessary to completely sever such current pull tab devices to obtain satisfactory access to their associated cans. Such current devices have sharp edges and are, of course, comparatively small and more difficult to see once they have been severed and discarded.

With combination strip 42 attached to beverage can 20 as illustrated in the drawings, it is unlikely that a party will be injured by strip 42 because it can't be seen. Being attached to the comparatively large cylindrical can 20 strip 42 will be avoided. Also during the process of cleaning up an area, it is more likely that because of its comparatively large size, each can 20 and its strip 42 will be picked up and placed in a suitable refuse container.

Top wall 23 for beverage can 20 may be made from any suitable material such as plastic, a composite material, or the like. In this example of the invention, top wall 23 is made from sheet means of metal preferably containing aluminum. The gauge thickness of the sheet metal containing aluminum is such that upon being suitably scored in a manner (as will be presently described) to define elongated strips 24 and 25 with common end means 26, it is an easy matter to sever strips 24 and 25 from top wall 23 while holding such strips together in the form of combination strip 42 and bending strip 42 away from opening 35 thus provided.

As shown particularly in FIGURE 13A of the drawings, score means is provided in top wall 23 to define the improved opening means of this invention. Such score means comprises a score line 45 commencing approximately at the center of top wall 23 and extending radially outwardly toward the periphery of such top wall and immediately adjacent thereto, then approximately parallel to such periphery for a limited distance, and then extending radially inwardly toward the center of top wall 23 to thereby define a roughly rectangular outline. Score line 45 commences at a first point 46 adjacent the center 44 of top wall 23 and after extending in the roughly rectangular pattern described above terminates at a second point shown at 47 which is spaced apart from point 46. In this example of the invention score line 45 is roughly keystone shaped with the wide transverse portion of the keystone shape arranged adjacent the peripheral edge of top wall 23. The keystone shape provided assures efficient dispensing of the contents of container 20.

Another score line 50 is provided within the outline of score line 45 and arranged generally in the shape of the numeral 7 having its base adjacent the center 44 of top wall 23. Score line 50 is arranged within the outline of keystone-shaped score line 45 so as to define common end means 26 as will be readily apparent from the drawings.

Score line 50, which is arranged in the shape of a numeral 7, has a looped base portion illustrated as a small arcuate loop at 51 which is approximately hemispherical in shape. Arcuate loop portion 51 is arranged adjacent point 46 which defines one free end of score line 45 and preferably coincides therewith.

Score line 50 extends within the roughly rectangular outline of score line 45 approximately parallel to the side edge thereof which commences at point 46 and extends radially outwardly therefrom. Score line 50 then extends approximately parallel to the side edge of score line 45 which extends around the periphery of top wall 23.

As seen in FIGURE 13A, the hemispherical score portion 51 outlines the rivet forming projection 27 while being spaced apart therefrom. Score portion 51 enables strip 24 to be initially started comparatively easily and severed to start the sequential severing action of severing first strip 24 and then strip 25.

The loop portion 51 is sufficiently spaced apart from the opposite edge of score line 45, terminating in free end 47, so as to define integral end portion 30 of strip 25 opposite common end 26 and adjacent fastening projection 27. End portion 30 is defined by a pair of approximately parallel score lines 53 and 54 extending respectively from points 46 and 47 comprising score line 45 previously described. Score lines 53 and 54 enable strip 25 to be torn therealong and in effect define the attached end for strip 25 and hence combination strip 42 assuring that strip 42 is not severed away from container 20. It will be seen particularly in FIGURE 13A that the width of end portion 30 provides adequate strength for holding strip 42 to can 20. Score lines 53 and 54 guide the position toward which combination strip 42 will be moved as well as adding to the overall length of such strip, thus further assuring easy bending of strip 42 over the peripheral edge of top wall 23 and along side wall 21 of container 20.

In this embodiment of the invention, as shown in FIGURES 1-6, score lines 53 and 54 are arranged to extend from their associated points 46 and 47 respectively in a generally parallel relation so that a central axis therebetween extends substantially parallel to the elongated axis of the area outlined by score line 45.

Thus, it will be seen from FIGURES 3-6 of the drawings that upon grasping pull ring 33 and pulling transverse top wall 23 in a direction indicated by arrow 36, combination strip 42 is held from being severed from top wall 23 by integral end portion 30 and such combination strip is bent over the peripheral circular edge of top wall 23 at a position practically diametrically opposite opening 35.

With the above described arrangement it is a simple matter to dispense the contents of beverage can 20 by either drinking directly from such opening or pouring therefrom without interference.

In the embodiment of this invention illustrated in FIGURES 7-12, a cylindrical beverage can is illustrated which is practically identical to the beverage can 20 of FIGURE 1 with the exception of certain score means provided in the top wall thereof. Therefore, the identical components of the embodiment of FIGURES 7-12 will be designated by the same numeral as in the previous embodiment followed in this latter embodiment by the reference letter A. Only those portions of this latter embodiment which are different from the previous embodiment will be described in detail and designated by a new reference numeral also followed by the letter designation A.

The score means arranged within the peripheral outline of keystone-shaped score line 45A is shown in this embodiment of the invention as a score line 56A having the general configuration of a mirror image of the number 7. Score line 56A has a looped terminal end portion at its base which extends in a small arcuate path or loop designated by the numeral 59A. Score line 56A also has a terminal tip 60A at its opposite end which extends parallel to a side of score line 45A for a small distance.

As described before, the keystone-shaped score line 45A in top wall 23A has a pair of spaced apart terminal or open ends defined in this embodiment by points 46A and 47A. A pair of diverging score lines 57A and 58A extend respectively from points 46A and 47A toward the outer periphery of top wall 23A so that a central axis therebetween roughly bisecting the area within score lines 57A and 58A extends approximately at an angle of 45 degrees from a line bisecting the area defined by the roughly keystone-shaped score line 45A.

This diverging arrangement of score lines 57A and 58A assures that as strips 24A and 25A are severed to define combination strip 42A, integral end portion 30A of strip 25A is securely held to top wall 23A by providing in effect attached end means having an increasing width. Pulling force is exerted in this embodiment of the invention by pulling ring 33A outwardly in transverse direction 36A to sever combination strip 42A in a manner as previously described in connection with combination strip 42. As terminal end portion 30A of strip 25A is severed along score lines 57A and 58A, the pulling force increases thereby assuring that such combination strip is not severed from the top wall 23A of container 20A.

In a similar manner as in the previous embodiment, combination strip 42A is sequentially severed from top wall 23A as illustrated particularly in FIGURES 9-11 and as shown in FIGURE 12 combination strip 42A is bent over the peripheral circular edge of top wall 23A and along side wall 21A of can 20A. With combination strip 42A positioned in the 45 degree position illustrated,, easy access is provided to opening 35A thus defined.

Figure 15:
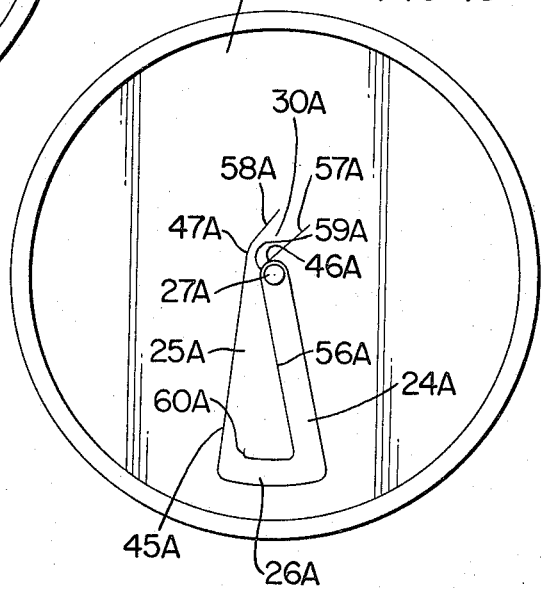
FIGURE 15 is an enlarged plan view of the blank used to make the top wall of the beverage can of FIGURE 7.

The blank for forming top wall 23A is illustrated particularly in FIGURE 15 of the drawings and it will be seen that it is an easy and simple matter to provide the desired score pattern within top wall 23A to assure that resultant combination strip 42A, defined once strips 24A and 25A with their common end 26A are severed away, will remain attached to its associated wall. Also, by scoring top wall 23A so as to provide score lines 57A and 58A at an angle with respect to the elongated axis of opening 35A, it is easier to hold can 20A in one hand and pull ring 33A to provide the desired opening 35A.

Figure 16:
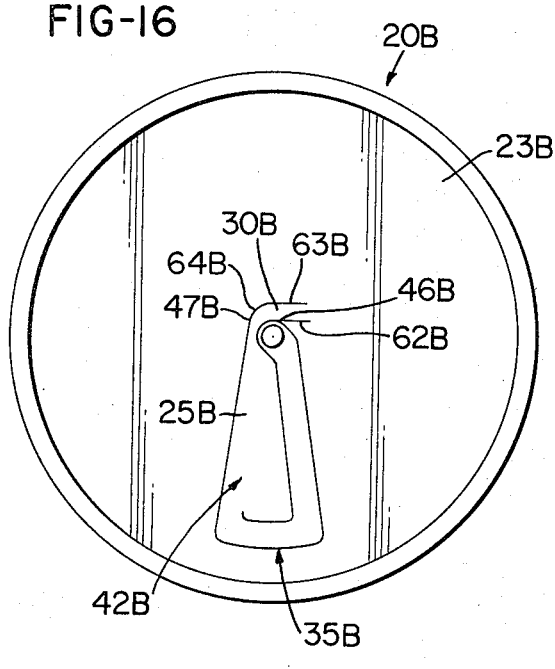
FIGURE 16 is an enlarged plan view similar to FIGURE 15 showing a modification of the blank of FIGURE 15.

FIGURE 16 illustrates a modification of the embodiment of this invention shown in FIGURES 7-12 and more specifically illustrates a modification of the blank illustrated in FIGURE 15. The modification illustrated in FIGURE 16 is basically identical to the embodiment of FIGURE 15; therefore, the same reference numerals used in FIGURE 15 will be applied to identical components of the modification of FIGURE 16 followed by the letter designation B and such identical components will not be described again. The only difference in the modification of FIGURE 16 is that a pair of score means 62B and 63B extending respectively beyond points 46B and 47B are arranged in such a manner so as to provide a strip or attached end means 30B for strip 25B having a central axis which is displaced approximately 90 degrees with respect to the axis of elongated opening 35B provided in top wall 23B.

As seen in FIGURE 16, score line 63B has an initial portion 64B which is slightly curved or arcuate in shape enabling the major portion thereof to be arranged generally parallel to and spaced apart from score line 62B extending from point 46B. In a similar manner as in the previous embodiments, the added small length provided by severing along score lines 62B and 63B further assures strip 42B can be bent over the peripheral edge of can 20B and along side wall 21B. Also the width or spacing between score lines 62B and 63B is sufficient to define integral end portion 30B capable of firmly holding combination strip 42B attached in position.

While the blanks illustrated in this disclosure of the invention are of generally circular peripheral outline and comprise the top wall of right circular cylindrical container means such as beverage cans 20, 20A, and 20B, it will be appreciated that blanks of any configuration could be employed and having the improved opening means of this invention incorporated therein. Also, the wall means in which such non-detachable opening means is incorporated is preferably made of a metal containing aluminum or the like. However, it will be appreciated that such opening means could be incorporated in wall means irrespective of the material of which they were made.

In the embodiments of this invention as shown in FIGURES 13A, 15, and 16 an associated pull ring is provided for severing the side-by-side elongated strips to define the associated combination strip as described. It will be appreciated that the blanks of FIGURES 13A, 15, and 16 could be constructed similar to blank 13 and that a pull device could be attached thereto as by welding or the like without requiring the use of integral rivet means.

Terms such as "top," "bottom," "side wall," etc. have been used in this disclosure of the invention for ease of description and merely to identify the various wall means of the cans illustrated in the drawings. It will be appreciated that such container means or cans may be oriented in any desired manner and that the use of such terms should not be considered as limiting the scope of this invention in any way.

Thus, it is seen that an improved container means having improved non-detachable opening means has been provided which can be opened simply and easily by grasping such opening means and applying a comparatively small severing force in a direction generally transverse the wall means in which such opening means is provided.

Further, this invention provides an improved method of making non-detachable opening means for container means such as beverage cans, or the like, while providing container means having maximum structural integrity.

In addition, improved blanks and methods of making such blanks having such non-detachable opening means are provided by this invention.

While the form of the invention now preferred has been disclosed as required by statute, other forms may be used, all coming within the scope of the claimed subject matter which follows.

What is claimed is:

1. A container means having non-detachable opening means in wall means thereof comprising, first and second elongated strip means provided in said wall means alongside each other and having common end means, said first strip means having fastening means in its end portion arranged opposite said common end means and said second strip means having attached end means attached to said wall means adjoining said fastening means, and pull means fastened to said first strip means by said fastening means, said first and second strip means being easily and sequentially severed to define an opening in said wall means by pulling said pull means with a force of comparatively small magnitude in a direction generally transverse said wall means to thus form combination strip means, whereby said combination strip means is held to said wall means by said attached end means and has an overall length defined by said first and second strip means pulled approximately end to end while being held together by said common end means, said overall length enabling said combination strip means to be moved away from said opening for easy dispensing of the contents of said container means therethrough.

2. Container means as set forth in claim 1 in which said wall means has score means therein defining said first and second strip means.

3. Container means as set forth in claim 2 in which said score means comprises; first score means commencing at a first point in said wall means, extending therefrom in a roughly rectangular manner to outline said first and second strip means, and terminating at a second point spaced apart from said first point; and second score means having a configuration similar to a numeral 7 arranged with its base portion adjacent said first point and extending within said roughly rectangular outline first score means and approximately parallel to a pair of adjoining side edges of said rectangular outline; said attached end means of said second strip means being arranged with a portion thereof within said first and second points, and said second score means defining a comon edge between said first strip means and said second strip means and further defining said common end means.

4. Container means as set forth in claim 2 in which said score means comprises; first score means commencing at a first point in said wall means, extending around said first and second strip means to define a roughly rectangular outline therefor, and terminating at a second point spaced apart from said first point; and second score means commencing at said first point, extending in a small arcuate path within the outline of said first score means, then generally parallel to one side of said first score means and within the outline thereof, and then generally parallel to and along an adjoining side of said roughly rectangular first score means; said second score means defining a common side edge between said first strip means and said second strip means and further defining said common end means.

5. Container means as set forth in claim 4 in which said attached end means of said second strip means adjoins said small arcuate path and is arranged within said first and second points and further comprises third and fourth score means extending respectively from said first and second points, said attached end means having a width assuring that said combination strip means is held firmly attached to said wall means.

6. Container means as set forth in claim 4 in which, said wall means comprises a top wall means of cylindrical container means, and said spaced apart points are positioned in said top wall means adjacent the center thereof, such that upon severing said combination strip means said overall length thereof is sufficient to enable it to be bent over the peripheral edge of said top wall means and along cylindrical side wall means of said container means.

7. Container means as set forth in claim 5 in which, said wall means comprises top wall means of cylindrical container means, said spaced apart points are positioned in said top wall means adjacent the center thereof, such that upon severing said combination strip means said overall length is increased by the length defined by said third and fourth score means and further assures easy bending of said combination strip means over the peripheral edge of said top wall means and along cylindrical side wall means of said container means.

8. Container means as set forth in claim 7 in which said third and fourth score means are arranged to extend from their associated points in generally parallel relation so that a central axis therebetween extends substantially parallel to the elongated axis of the area outlined by said first score means enabling said easy bending at a position approximately in line with said elongated axis.

9. Container means as set forth in claim 7 in which said third and fourth score means are formed and arranged to extend from their associated points so the major portions thereof are in generally parallel relation and so that a central axis therebetween extends substantially at ninety degrees to the elongated axis of the area outlined by said first score means enabling said easy bending at a position displaced about ninety degrees from said elongated axis.

10. Container means as set forth in claim 7 in which said third and fourth score means are arranged to extend from their associated points in a generally diverging manner to provide said attached end means of increased width for better holding of said combination strip means and so that a central axis therebetween extends substantially at forty-five degrees to the elongated axis of the area outlined by said first score means enabling said easy bending at a position displaced about forty-five degrees from said elongated axis.

11. Container means as set forth in claim 10 in which said top wall means is circular in shape and said first score means comprises a roughly keystone-shaped rectangular outline arranged with the wide transverse portion of the keystone-shaped outline adjacent the peripheral edge of said circular top wall means.

12. An improved method of making non-detachable opening means in wall means comprising the steps of, providing said wall means, providing first and second elongated strip means in said wall means arranged alongside each other and having common end means, said first strip means having fastening means in its end portion arranged opposite said common end means and said second strip means having attached end means attached to said wall means adjoining said fastening means, providing pull means, and fastening said pull means to said first strip means by said fastening means, whereby said first and second strip means are easily and sequentially severed to define an opening in said wall means by pulling said pull means with a force of comparatively small magnitude generally transverse said wall means to thus form combination strip means held to said wall means by said attached end means and having an overall length defined by said first and second strip means pulled approximately end to end while being held together by said common end means, said overall length enabling said combination strip means to be moved away from said opening for easy access thereto.

13. The method as set forth in claim 12 in which said step of providing first and second strip means in said wall means comprises providing score means in said wall means defining said first and second strip means.

14. The method as set forth in claim 12 in which said step of providing score means comprises providing; first score means commencing at a first point in said wall means, extending around said first and second strip means to define a roughly rectangular outline therefor, and terminating at a second point spaced apart from said first point; and providing second score means commencing at said first point, extending in a small arcuate path within the outline of said first score means, then generally parallel to one side of said first score means and within the outline thereof, and then generally parallel to and along an adjoining side of said roughly rectangular first score means; said second score means defining a common side edge between said first strip means and said second strip means and further defining said common end means.

15. The method as set forth in claim 14 in which said attached end means of said second strip means adjoins said small arcuate path and is arranged within said first and second points and said step of providing score means further comprises providing third and fourth score means extending respectively from said first and second points, said attached end means having a width assuring that said combination strip means is held firmly attached to said wall means.

16. The method as set forth in claim 14 in which, said step of providing wall means comprises providing top wall means of cylindrical container means, and said spaced apart points are positioned in said top wall means adjacent the center thereof, such that upon severing said combination strip means said overall length thereof is sufficient to enable it to be bent over the peripheral edge of said top wall means and along cylindrical side wall means of said container means.

17. The method as set forth in claim 15 in which, said step of providing wall means comprises providing top wall means of cylindrical container means, and said spaced apart points are positioned in said top wall means adjacent the center thereof, such that upon severing said combination strip means said overall length is increased by the length defined by said third and fourth score means and further assures easy bending of said combination strip means over the peripheral edge of said top wall means and along cylindrical side wall means of said cylindrical container means.

18. The method as set forth in claim 17 in which said step of providing said third and fourth score means comprises extending said third and fourth score means from their associated points in generally parallel relation so that a central axis therebetween extends substantially parallel to the elongated axis of the area outlined by said first score means enabling said easy bending at a position in line with said elongated axis.

19. The method as set forth in claim 17 in which said step of providing said third and fourth score means comprises extending said third and fourth score means from their associated points so the major portions thereof are in generally parallel relation and so that a central axis therebetween extends substantially at ninety degrees to the elongated axis of the area outlined by said first score means enabling said easy bending at a position displaced about ninety degrees from said elongated axis.

20. The method as set forth in claim 17 in which said step of providing said third and fourth score means comprises extending said third and fourth score means from their associated points in a generally diverging manner to provide said attached end means of increased width for better holding of said combination strip means and so that a central axis therebetween extends substantially at forty-five degrees to the elongated axis of the area outlined by said first score means enabling said easy bending at a position displaced about forty-five degrees from said elongated axis.

21. A blank being suitably cut and scored to define wall means of container means having integral non-detachable opening means therein, said wall means having score means defining first and second elongated strip means arranged in said wall means alongside each other and having common end means, said first strip means having its end portion arranged opposite said common end means and said second strip means having integral end means adjoining said end portion, and said first and second strip means being easily and sequentially severed to define an opening in said wall means by grasping and pulling said end portion with a force of comparatively small magnitude in a direction generally transverse to said wall means to thus form combination strip means, whereby said combination strip means is held to said wall means by said integral end means and has an overall length defined by said first and second strip means pulled approximately end to end while being held together by said common end means, said overall length enabling said combination strip means to be moved away from said opening for easy access thereto.

22. A blank as set forth in claim 21 in which said score means comprises; first score means commencing at a first point in said wall means, extending around said first and second strip means to define a roughly rectangular outline therefor, and terminating at a second point spaced apart from said first point; second score means commencing at said first point, extending in a small arcuate path within the outline of said first score means, then generally parallel to one side of said first score means and within the outline thereof, and then generally parallel to and along an adjoining side of said roughly rectangular first score means; said second score means defining a common side edge between said first strip means and said second strip means and further defining said common end means; and said integral end means of said second strip means adjoins said small arcuate path and is arranged within said first and second points and further comprises third and fourth score means extending respectively from said first and second points, said integral end means having a width assuring that said combination strip means is held firmly attached to said wall means.

23. A blank as set forth in claim 22 in which, said wall means comprises top wall means made from material means containing metal and cut in circular form and adapted for use on cylindrical container means, and said spaced apart points are positioned in said top wall means adjacent the center thereof, such that upon severing said combination strip means said overall length is increased by the length defined by said third and fourth score means and further assures easy bending of said combination strip means over the peripheral circular edge of said top wall means and along cylindrical side wall means of said container means.

24. A blank as set forth in claim 23 in which said third and fourth score means are arranged to extend from their associated points in generally parallel relation so that a central axis therebetween extends substantially parallel to the elongated axis of the area outlined by said first score means enabling said easy bending at a position approximately in line with said elongated axis.

25. A blank as set forth in claim 23 in which said third and fourth score means are formed and arranged to extend from their associated points so that a central axis between their major portions extends at an angle to the elongated axis of the area outlined by said first score means enabling said easy bending at a peripheral position on said circular top wall which is displaced by the amount of said angle from said elongated axis.

26. A blank as set forth in claim 25 in which said third and fourth score means are arranged to extend from their associated points in a generally diverging manner to thereby provide said integral end means of increased width for better holding of said combination strip means.

27. A method of making non-detachable opening means in a blank comprising wall means of container means comprising the steps of, providing sheet means of material, suitably cutting and scoring said sheet means to define said blank comprising said wall means and having said non-detachable opening means therein, said scoring defining first and second elongated strip means in said wall means arranged alongside each other and having common end means, said first strip means having an end portion arranged opposite said common end means, and arranging said second strip means so that integral end means thereof adjoin said end portion, whereby said scoring enables said first and second strip means to be easily and sequentially severed to define an opening in said wall means, by grasping and pulling said end portion with a force of comparatively small magnitude in a direction generally transverse said blank to thus form combination strip means, said combination strip means being held to said wall means by said integral end means and having an overall length defined by said first and second strip means pulled approximately end to end while being held together by said common end means, and said overall length enabling said combination strip means to be moved away from said opening for easy access thereto.

28. The method as set forth in claim 27 in which said scoring step comprises providing score means including; first score means commencing at a first point in said wall means, extending around said first and second strip means to define a roughly rectangular outline therefor, and terminating at a second point spaced apart from said first point; second score means commencing at said first point, extending in a small arcuate path within the outline of said first score means, then generally parallel to one side of said first score means and within the outline thereof, and then generally parallel to and along an adjoining side of said roughly rectangular first score means; said second score means defining a common side edge between said first strip means and said second strip means and further defining said common end means; and said integral end means of said second strip means adjoins said small arcuate path and is arranged with a portion thereof within said first and second points and further comprises third and fourth score means extending respectively from said first and second points, said integral end means having a width assuring that said combination strip means is held firmly attached to said wall means.

29. The method as set forth in claim 28 comprising the further steps of; providing fastening means in said end portion; providing pull means; fastening said pull means to said end portion with said fastening means; and in which said wall means comprises top wall means made from said sheet means containing metal and cut in circular form and adapted for use on cylindrical container means, said spaced apart points are positioned in said top wall means adjacent the center thereof, such that upon severing said combination strip means by pulling said pull means said overall length is increased by the length defined by said third and fourth score means and further assures easy bending of said combination strip means over the peripheral circular edge of said top wall means and along cylindrical side wall means of said container means.

30. The method as set forth in claim 29 in which said third and fourth score means are arranged to extend from their associated points in generally parallel relation so that a central axis therebetween extends substantially parallel to the elongated axis of the area outlined by said first score means enabling said easy bending at a position in line with said elongated axis.

31. The method as set forth in claim 29 in which said third and fourth score means are formed and arranged to extend from their associated points so that a central axis between their major portions extends at an angle to the elongated axis of the area outlined by said first score means enabling said easy bending at a peripheral position on said circular top wall which is displaced by the amount of said angle from said elongated axis.

32. The method as set forth in claim 31 in which said third and fourth score means are arranged to extend from their associated points in a generally diverging manner to thereby provide said integral end means of increased width for better holding of said combination strip means.

References Cited
UNITED STATES PATENTS

| | | | |
|---|---|---|---|
| 2,112,231 | 3/1938 | Speidel | 220—54 |
| 3,327,891 | 3/1965 | Smyth | 220—54 |

THERON E. CONDON, *Primary Examiner.*

G. T. HALL, *Assistant Examiner.*